US006615811B1

(12) United States Patent  
Butler, Jr.

(10) Patent No.: US 6,615,811 B1  
(45) Date of Patent: Sep. 9, 2003

(54) IGNITION COIL INTEGRATED ION SENSE WITH COMBUSTION AND KNOCK OUTPUTS

(75) Inventor: Raymond O. Butler, Jr., Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/091,247

(22) Filed: Mar. 4, 2002

(51) Int. Cl.[7] .................................................. G01L 23/23
(52) U.S. Cl. ........................ 123/606; 123/625; 73/35.08
(58) Field of Search ................................. 123/606, 625; 73/35.08

(56) References Cited

U.S. PATENT DOCUMENTS

| | | | |
|---|---|---|---|
| 5,675,072 A | 10/1997 | Yasuda et al. | 73/35.08 |
| 5,676,113 A | 10/1997 | Johansson et al. | 123/425 |
| 5,694,900 A | 12/1997 | Morita et al. | 123/425 |
| 5,769,049 A | 6/1998 | Nytomt et al. | 123/435 |
| 5,775,298 A | 7/1998 | Haller | 123/425 |
| 5,803,047 A | 9/1998 | Rask | 123/425 |
| 5,814,994 A | 9/1998 | Hohner et al. | 324/380 |
| 5,866,808 A | 2/1999 | Ooyabu et al. | 73/116 |
| 6,092,015 A * | 7/2000 | Takahashi et al. | 73/35.08 |
| 6,155,241 A * | 12/2000 | Hohner et al. | 123/625 |
| 6,196,054 B1 * | 3/2001 | Okamura et al. | 73/35.08 |
| 6,360,587 B1 * | 3/2002 | Noel | 73/35.08 |
| 6,550,456 B1 * | 4/2003 | Uchida et al. | 73/35.08 |
| 2002/0066444 A1 * | 6/2002 | Ikeda et al. | 123/606 |
| 2002/0144539 A1 * | 10/2002 | Yorita et al. | 73/35.08 |

* cited by examiner

Primary Examiner—Erick Solis  
(74) Attorney, Agent, or Firm—Margaret A. Dobrowitsky

(57) ABSTRACT

An ignition coil having ion sense capability with combustion and knock outputs features improved determination of when to open and close a combustion window during which a combustion signal indicative of the level of combustion is calculated. The system also includes a knock window during which a knock signal indicative of the level of knock is determined. A PWM combustion signal is multiplexed on the same physical line as a current flag signal, and, a PWM knock intensity signal is multiplexed on the same physical line as a knock window signal, which reduces system connections. Closed loop multicharge ignition is provided with combustion detection during multicharging to ensure the availability of knock detection, thereby providing a longer effective spark burn time while still allowing for knock detection.

24 Claims, 8 Drawing Sheets

EST ——————⎤\_\_⎦——————→ *Fig. 10A*

PRIMARY CURRENT RECHARGE TRIP LEVEL

PRIMARY CURRENT → *Fig. 10B*

SECONDARY CURRENT → *Fig. 10C*

SECONDARY CURRENT DISCHARGE TRIP LEVEL

FOULED PLUG WINDOW → *Fig. 10D*

DWELL → *Fig. 10E*

← TURN ON RING OUT DELAY

COMBUSTION WINDOW → *Fig. 10F*

IGNITION COIL INTEGRATED ION SENSE WITH COMBUSTION AND KNOCK OUTPUTS

RELATED APPLICATIONS

This application is related to U.S. application Ser. No. 10/091,312, filed Mar. 4, 2002, entitled "PROCESSING AND INTERFACE METHOD FOR ION SENSE-BASED COMBUSTION MONITOR," assigned to the common assignee of the present invention, hereby incorporated by reference in its entirety.

BACKGROUND OF THE INVENTION

1. Technical Field

The invention relates generally to a system for controlling ignition in an internal combustion engine, and, more particularly, to an ignition coil having integrated ion sense capability with combustion and knock outputs.

2. Description of the Related Art

It is desirable to detect a misfire condition or a knock condition during the operation of an internal combustion engine. One approach taken in the art to detect misfire involves assessing the degree of engine speed (RPM) variation. Although such an approach does not require additional circuit components, it does require relatively extensive software to perform the evaluation, and, further, is incapable of producing accurate and reliable results over the entire engine speed and load range on a higher number of cylinder engines.

Another approach for determining misfire or knock involves the use of a so-called ion sense system. It is known that the combustion of an air/fuel mixture in an engine results in molecules in the cylinder being ionized. It is further known to apply a relatively high voltage across, for example, the electrodes of a spark plug just after the ignition operation to produce a current across the electrodes. Such current is known as ion current. The ion current that flows is proportional to the number of combustion ions present in the area of, for example, the spark plug gap referred to above, and is consequently indicative of the ionization throughout the entire cylinder as combustion occurs. The DC level or amount of ion current is indicative of the quantity of the combustion event, or whether in fact combustion has occurred at all (e.g., a misfire condition). An AC level of the ion current may also be used to determine whether knock exists. The ion sense approach is effective for any number of cylinder engines and various engine speed and load combinations.

A challenge for ion sense designers, however, arises from a characteristically short spark duration (e.g., 500–600 microseconds) compared to non-ion sense systems (e.g., 1000–1500 microseconds). This duration may become an issue at low engine speeds, which need a longer duration spark to initiate combustion, due to flow and charge mixture factors, among other things. One solution involves employing repetitive spark during a single combustion event ("multicharging") at low engine speeds. However, there are challenges with using multicharging. For example, one conventional approach applies repetitive spark over a fixed duration, which may in some instances interfere with knock detection (i.e., knock detection via analysis of ion current cannot be accomplished while sparking continues in the cylinder).

Another challenge involves determining the degree or quality of combustion. In another known system, the earliest time for beginning the processing of ion current is a fixed time delay after the initial spark. This delay is configured to mask the spikes, noise and the like associated with the spark itself. Such delay, however, is conservatively selected to account for variations in the duration of the spark-related noise (e.g., due to the variations in engine speed and load). However, in many instances, this results in a delay in commencing processing, thus effectively ignoring useful information. Additionally, conventional systems do not extend processing of the ion current to the greatest extent possible, also losing information.

Another problem with conventional systems pertains to the unavailability of up-to-date timing information. For example, a known system of the type that uses a main dwell signal (i.e., that defines coil charge initiation and spark timing) uses a so-called current flag as feedback for dwell control. Such current flag is generated when the primary current in the ignition coil reaches a predetermined level. This feedback is used because the main dwell signal can become stale (i.e., available only every two revolutions of the crankshaft in a four cycle IC engine). However, such conventional current flag signals are not used in controlling multicharge operation or in providing overall timing.

In addition, conventional ignition systems are plagued with a proliferation of control, data, and timing lines to the main control unit. It would be desirable to reduce such connections to improve reliability and/or reduce cost.

There is therefore a need to provide an apparatus for detecting a combustion condition or knock condition that minimizes or eliminates one or more of the shortcomings as set forth above.

SUMMARY OF THE INVENTION

One object of an ignition apparatus of the present invention is to provide a solution to one or more of the above-identified problems. In general, the invention is characterized by several advantages. One advantage is that it integrates relatively easily into existing ignition systems. Another advantage is that it incorporates closed loop multicharge ignition which provides a longer effective "spark bum" time (when appropriate) without interfering with ion sense processing (i.e., determination of both combustion and knock). Still another advantage is that is optimizes a so-called combustion detection window, providing a better base of information upon which to determine a combustion condition including knock. Still yet another advantage is that it minimizes the number of wires required to connect to an existing ignition system (i.e., to a control unit such as an engine control unit). The invention is embodied in several different aspects.

In one aspect of the invention, a current flag trip signal (hereinafter "CF_Trip" or CF TRIP signal) is provided for improving (i) closed loop dwell control, (ii) the closing of the combustion window, and (iii) coordinating output signal timing. According to this aspect of the invention, a method is provided for operating a plurality of ignition coils in a multi-cylinder internal combustion engine. The method includes four basic steps. The first step involves initiating combustion in a first cylinder using a first one of the ignition coils. Next, detecting an ionization level in the first cylinder during a combustion window. The third step involves generating a current flag trip signal when a primary current through a second one of the ignition coils meets predetermined criteria. Finally, closing the combustion window for the first cylinder as a function of when the current flag trip signal is generated for the second cylinder. In a preferred embodiment, the second cylinder is the next cylinder in the firing order.

In a second aspect of the invention, the opening of the above combustion window is improved upon by more accurately determining the end of the spark event. According to this aspect of the invention, a method is provided for operating an ignition coil for an internal combustion engine. This method also includes four basic steps. The first step involves generating a spark in a cylinder using the ignition coil wherein a secondary current is established through the ignition coil. Next, determining when the secondary current has discharged to a preselected level and thereafter initiating a delay. The third step involves opening a combustion window after expiration of the delay. Finally, detecting a level of ionization in the subject cylinder during the combustion window.

In third aspect of the invention, a combustion signal indicative of the level of combustion is multiplexed on the same line as the above-mentioned CF_Trip signal, thereby reducing the number of lines or connections in the system (i.e., between the ignition coils and a control unit). In a preferred embodiment, the combustion signal is a pulse width modulation (PWM) signal.

In a fourth aspect of the invention, a knock signal indicative of the level of knock is multiplexed on the same line as a knock window signal (preferably generated by a control unit). This aspect of the invention also reduces the number of lines or connections. In a preferred embodiment, the knock signal is a PWM signal.

In a fifth aspect of the invention, the above-mentioned combustion signal is used to terminate a multicharge mode of operation (i.e., the process of delivering multiple sparks per combustion event per cylinder) so as to not interfere with knock detection. This aspect allows a longer effective "burn time" while ensuring knock detection availability.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

FIGS. 10A–10F show, in greater detail, multicharge timing diagrams of FIGS. 6A–6M.

DETAILED DESCRIPTION OF THE PREFERRED EMBODIMENTS

Figure 1:
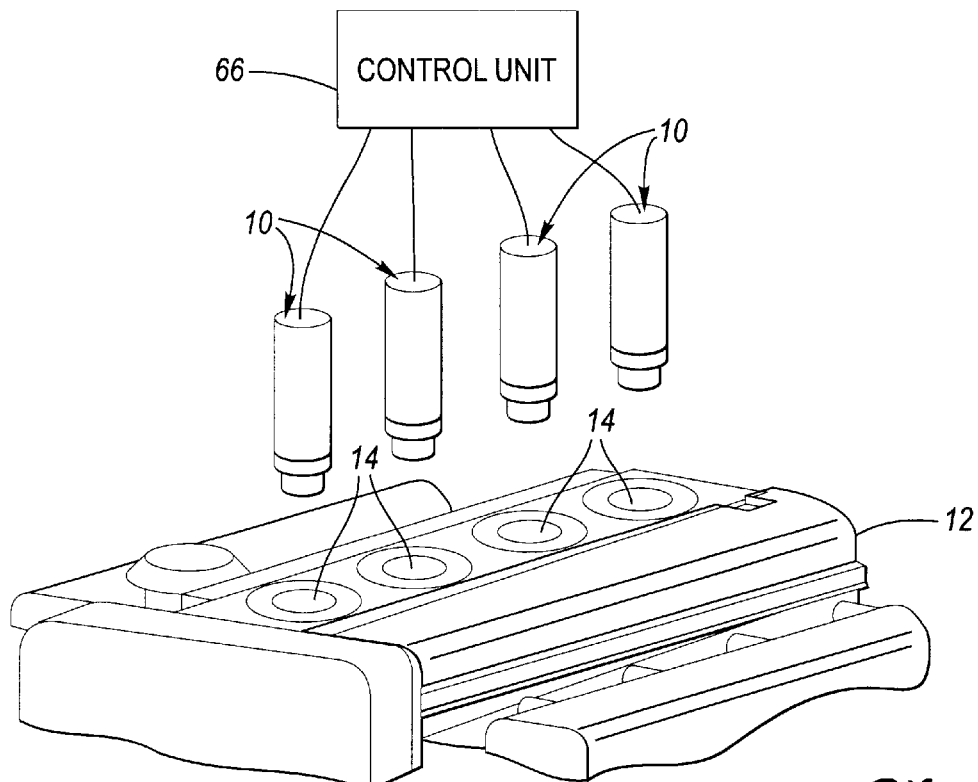
FIG. 1 is a simplified diagrammatic view of an ignition system having an ignition coil according to the invention.

Referring now to the drawings wherein like reference numerals are used to identify identical components in the various views, FIG. 1 shows a preferred embodiment of an integrated ignition apparatus or coil 10 having ion sense capability. Coil 10 is adapted for installation to a conventional internal combustion engine 12 by way of a spark plug in threaded engagement with a spark plug opening 14 into a combustion cylinder. Generally, overall spark timing (dwell control) and the like is provided by a control unit 16. In the illustrated embodiment, one ignition coil is provided per spark plug. The plurality of ignition coils 10, in one embodiment, share multiple communication lines with control unit 16.

Figure 2:
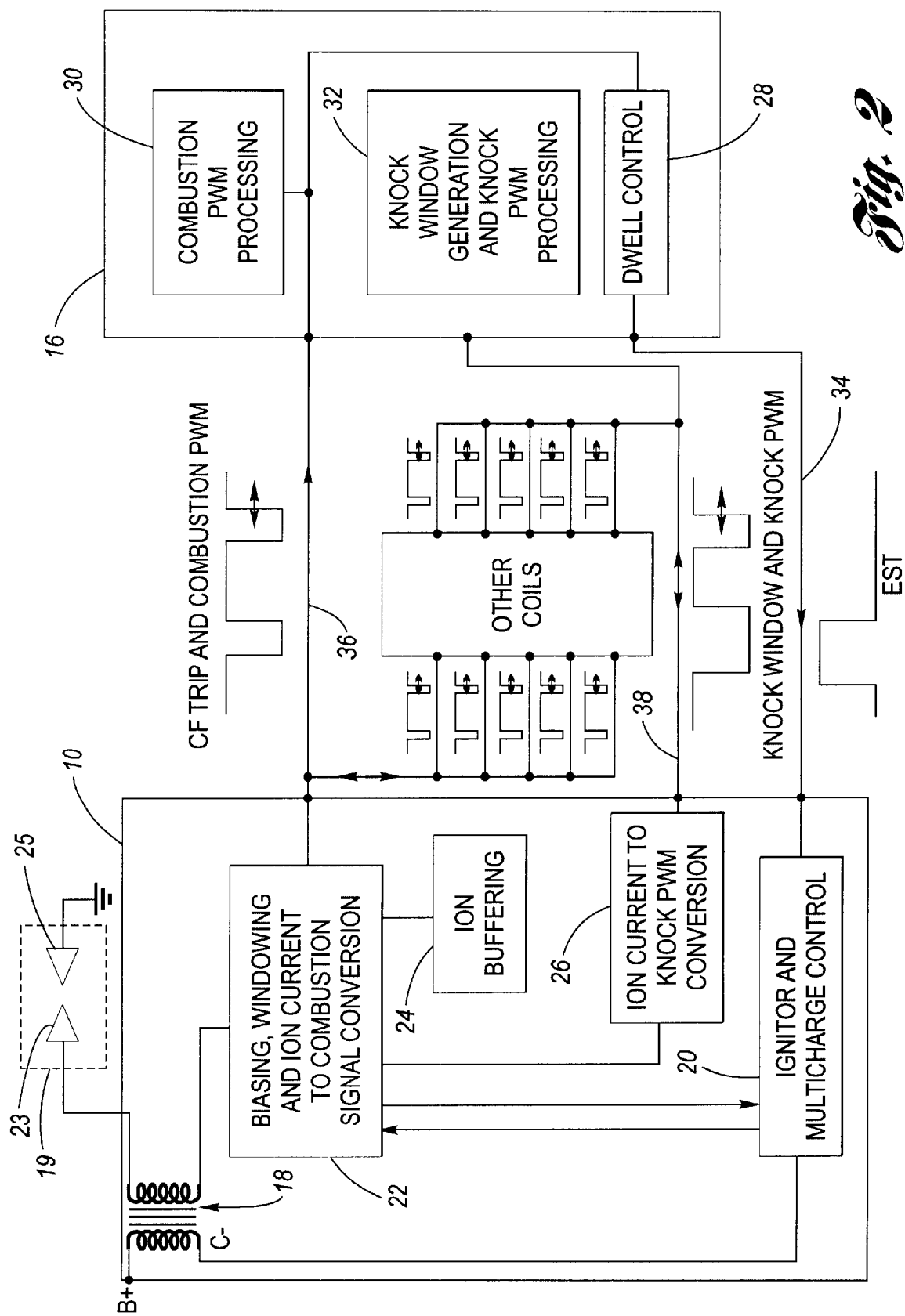
FIG. 2 is simplified block diagram view showing, in greater detail, the ignition coil and a control unit of FIG. 1.
Figure 3:
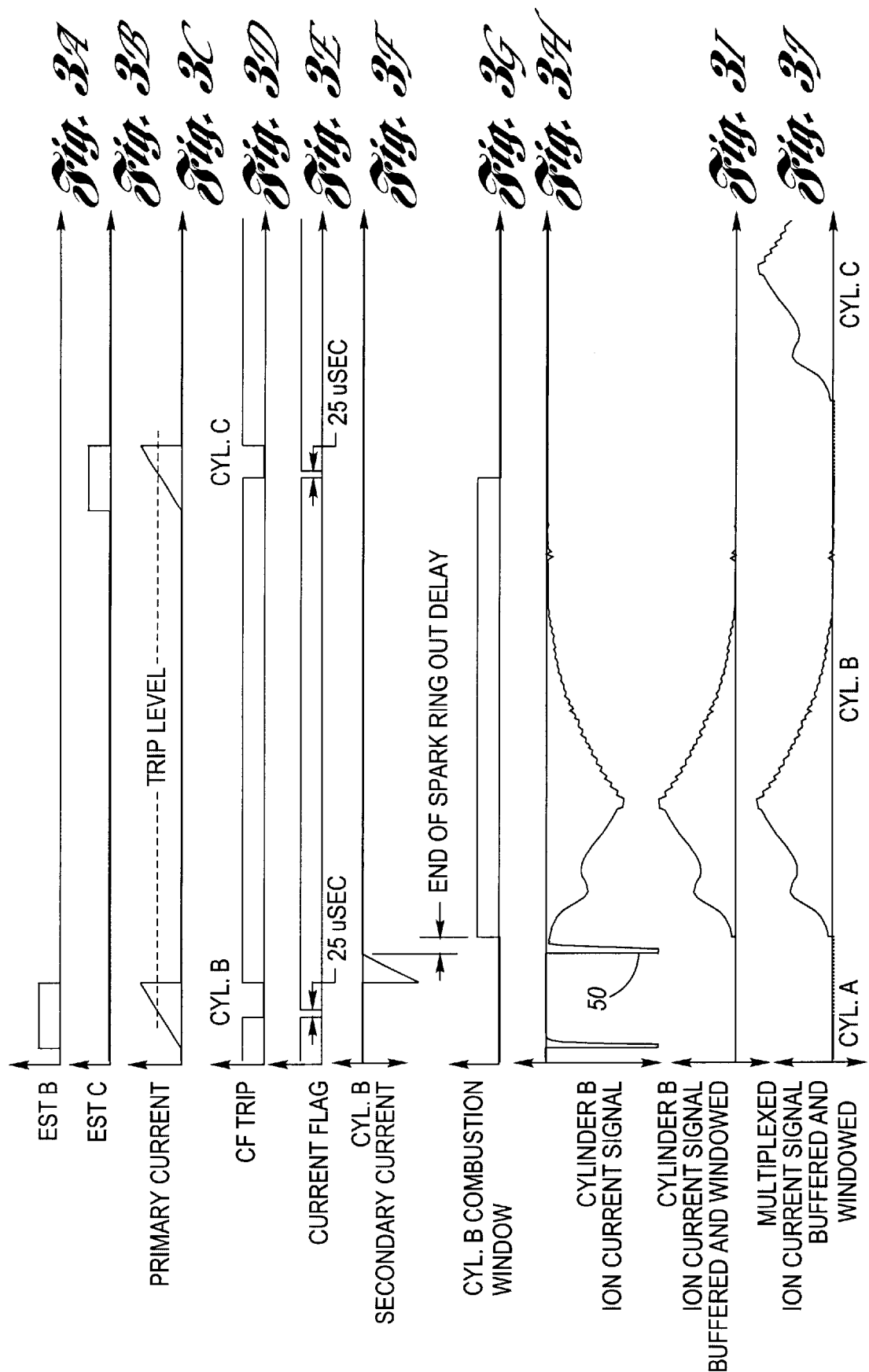
FIGS. 3A–3J, 4A–4J, 5A–5J and 6A–6M are simplified timing diagrams of various signals present in and output from the system of FIG. 1.
Figure 4:
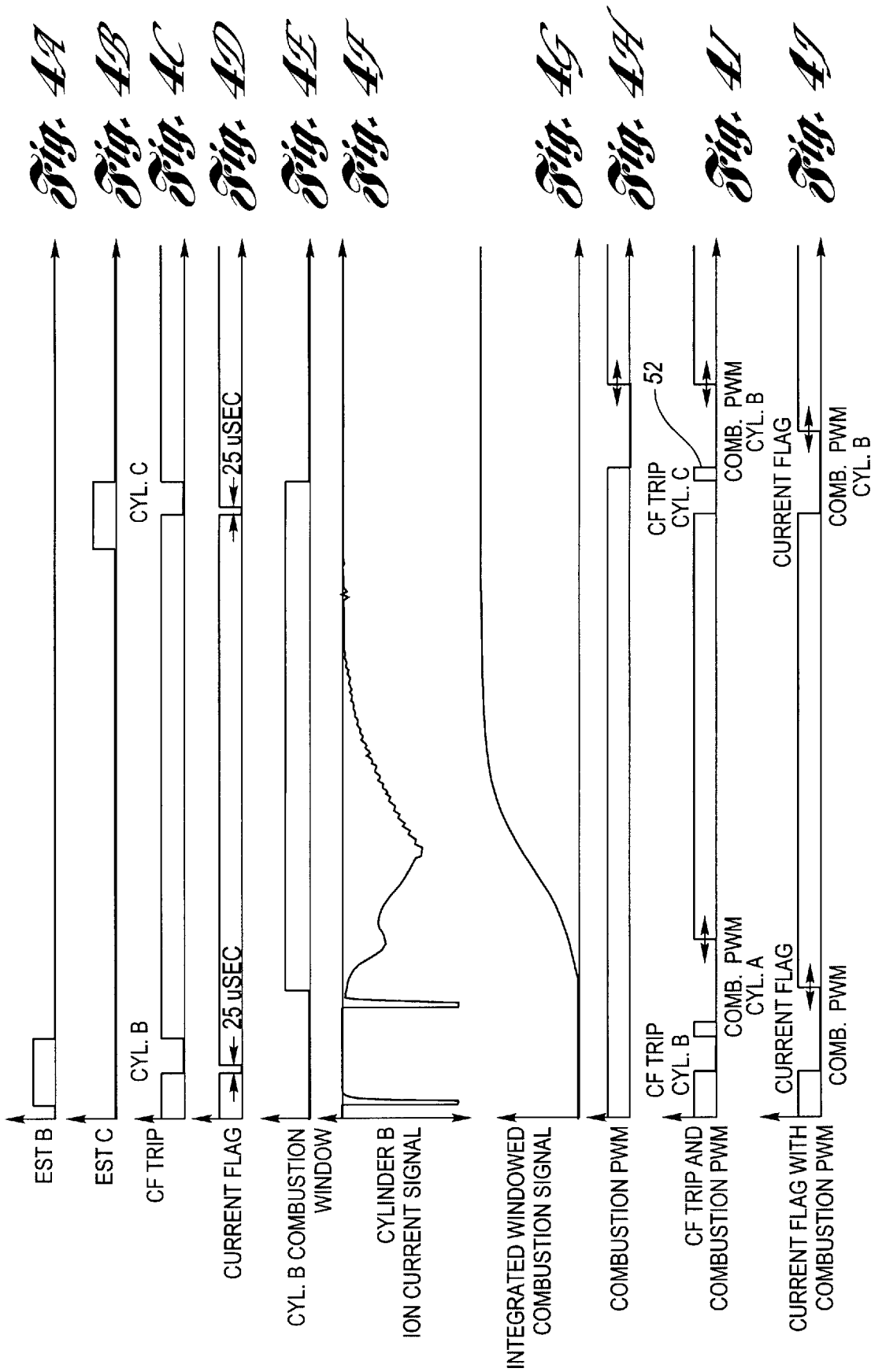
Figure 5:
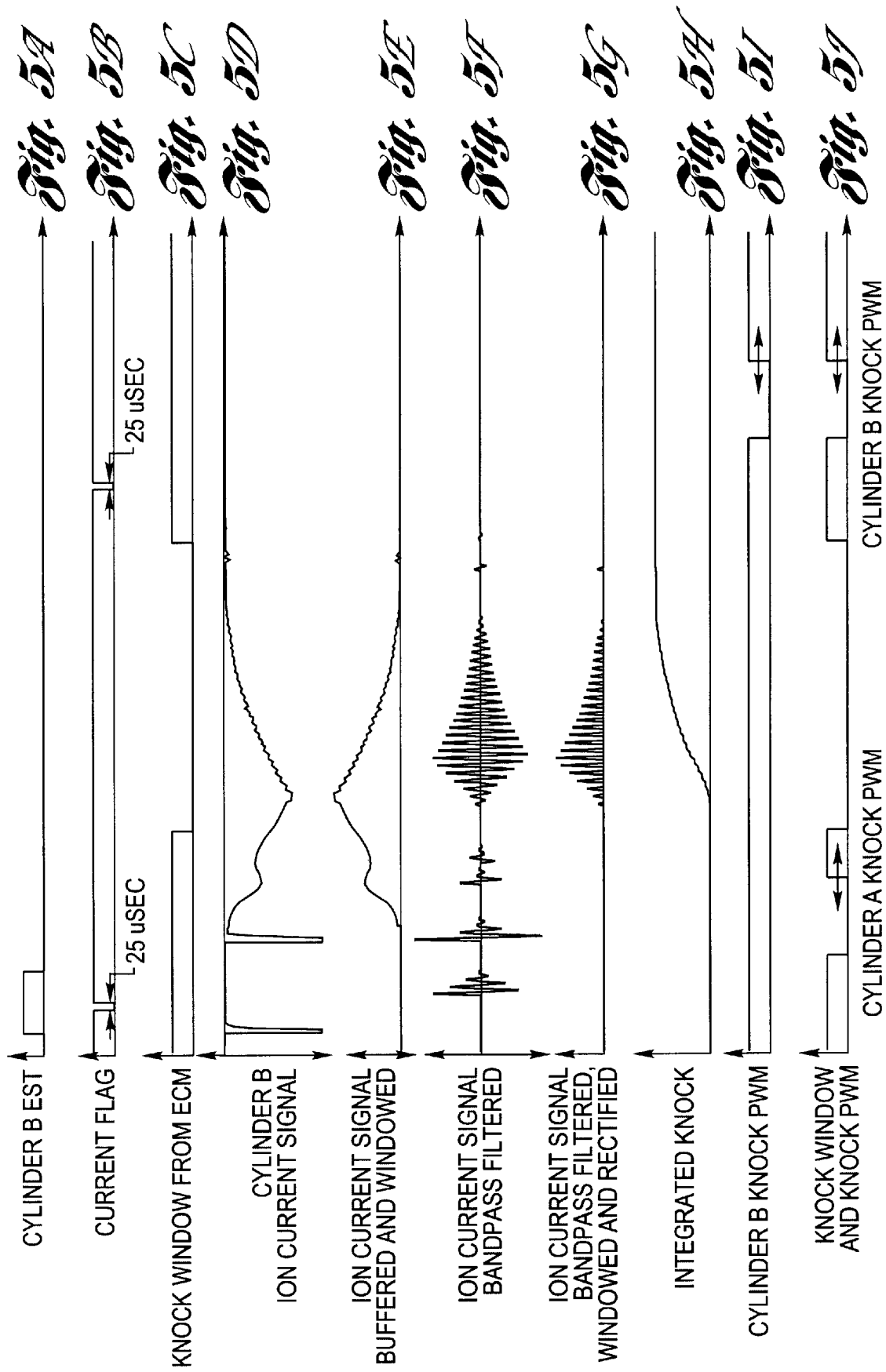
Figure 6:
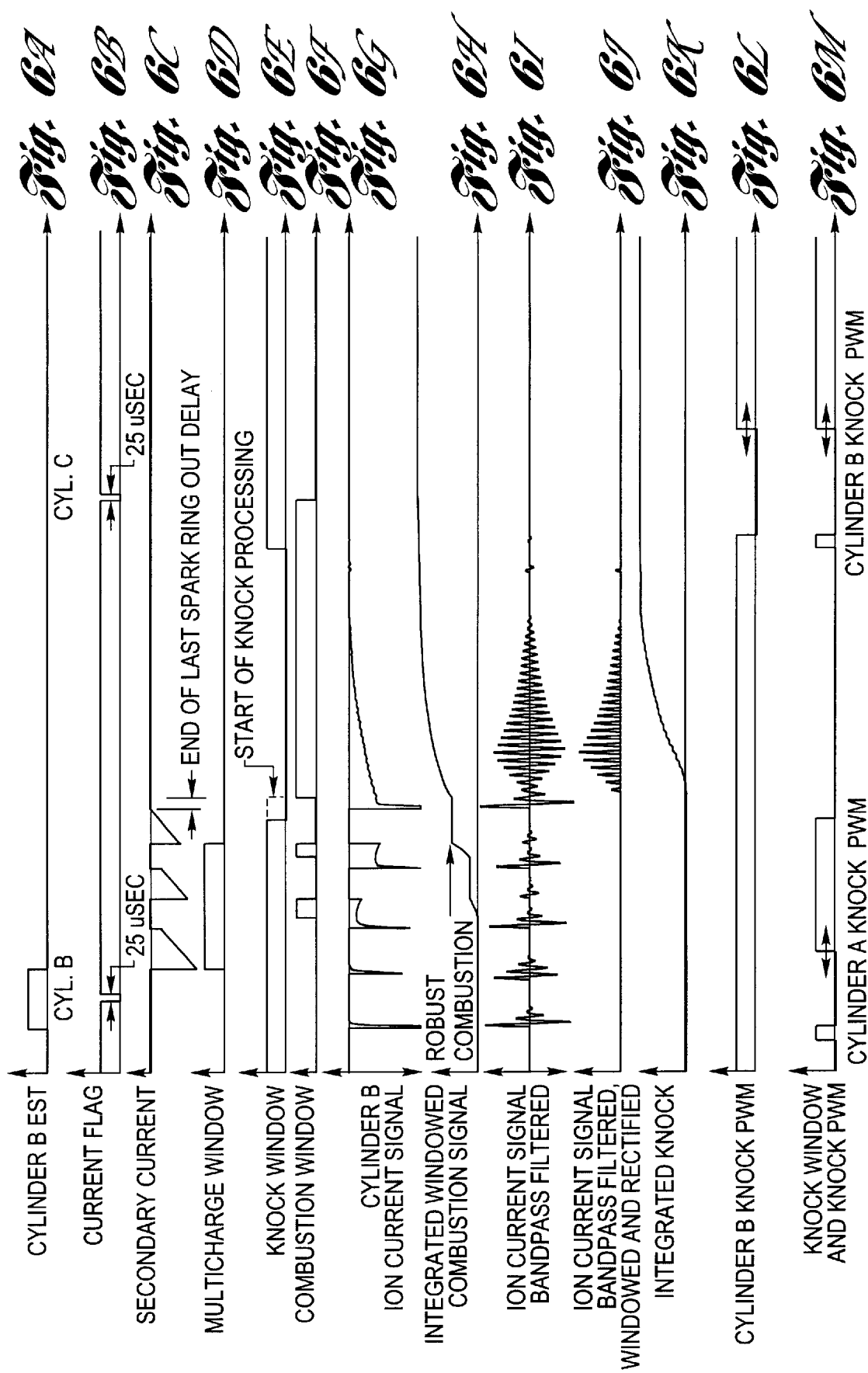

FIG. 2 shows ignition coil 10 and control unit 16 in greater detail. Ignition coil 10 is shown having a high-voltage transformer portion 18 coupled to a spark plug 19, an ignitor and multicharge control block 20, a biasing, windowing and ion current-to-combustion signal conversion block 22, an ion buffering block 24, and an ion current-to-knock pulse-width-modulation (PWM) conversion block 26. Control unit 16 is shown having a dwell control block 28, a combustion PWM processing block 30 and a knock window generation and knock PWM processing block 32. In the illustrated embodiment, various signals/signal lines are coupled between ignition coil 10 and control unit 16, including an electronic spark timing (EST) signal on line 34, a current flag trip (CF TRIP) signal and a combustion PWM signal on line 36, and a knock window signal and a knock PWM signal on line 38.

Control unit 16 may comprise an engine controller or Electronic Control Unit (ECU). The control unit 16 may include, for example, a central processing unit (CPU), memory, and input/output, all operating according to preprogrammed strategies. The strategies enable control unit 16 to perform various functions related to at least engine control.

For example, control unit 16, in addition to spark control, also controls fuel delivery, air control and the like. In a global sense, control unit 16 is configured to control overall combustion in the engine.

Transformer portion 18 includes a primary and secondary winding and is configured to function as an inductive ignition coil. One end, such as the high side end, of the primary winding is connected to a supply voltage provided by a power supply, such as a vehicle battery (not shown), hereinafter designated "B+" in the drawings. Supply voltage B+ may nominally be approximately 12 volts. A second end of the primary winding opposite the high side end is connected to ignitor and multicharge control 20. A first end of the secondary winding, namely the high side end, is coupled to spark plug 19. A second end of the secondary winding opposite the high side end is connected to a ground node through block 22. The primary and secondary windings are matched in a predetermined manner known in the art.

Spark plug 19 is disposed in engine 12 proximate a cylinder thereof, and is configured to produce a spark across a gap defined by spaced electrodes 23, 25. The spark event, as is generally understood by those of ordinary skill in the art, is provided to ignite an air and fuel mixture introduced into the cylinder. During the spark event, a spark current flows across plug electrodes 23, 25. In addition, spark plug 19 is configured so that when biased by a voltage an ion current may be carried across electrodes 23, 25. The magnitude of a DC component of the ion current is indicative of a combustion condition, such as combustion, and/or misfire. In particular, the greater the ion current (i.e., due to more ionized molecules present in the cylinder), the more complete the combustion. In addition, the presence of an AC component of the ion current is indicative of a knock condition. A first knock mode is defined based on the magnitude of the AC component of the ion current in a range between approximately 5–6 kHz. A second knock mode is defined based on the magnitude of the AC component of the ion current in a range between approximately 10–12 kHz. According to the invention, the foregoing determinations of the respective DC and AC component magnitudes are determined during a combustion window and a knock window, respectively. The starting and ending times, as well as duration, of each window is important in more accurately determining both a combustion condition as well as a knock condition, as more fully developed below.

Block 20 is provided to selectively connect the primary winding to ground based on the EST signal. Such connection, as is known generally in the art, will cause a primary current $I_P$ to flow through the primary winding. Block 20 may comprise conventional components known to those of ordinary skill in the art, for example, a bipolar transistor, a MOSFET transistor, or an insulated gate bipolar transistor. Block 20 is further configured, as will be described in greater detail below, to control transformer 18 so as to apply repetitive sparks to the combustion chamber during a single combustion event, herein referred to as multicharge operation (i.e., for the multiple charging/discharging cycles of transformer portion 18).

The EST signal is generated by dwell control 28 of control unit 16 in accordance with known strategies based on a plurality of engine operating parameters as well as other inputs. Dwell control 28 generally involves the control of the timing of the initiation of the spark event (i.e., at a crankshaft position in degrees relative to a top dead center position of a piston in the cylinder) as well as a duration. The asserted ignition control signal EST is the command to commence charging of the ignition coil 10 for a spark event. Block 20, in response thereto, causes a switch or the like (best shown in FIG. 8) to conduct, wherein a primary current $I_p$ flows through the primary winding. The EST signal is applied, in the illustrated embodiment, as a positive going pulse having a duration corresponding to a desired primary ignition coil charge time. Charging commences at the time of receipt by block 20 of a rising (positive going) edge of the EST signal. Upon receipt of a falling (negative going) edge of the EST signal, block 20 causes an interruption in the primary current $I_p$. It is well understood by those of ordinary skill in the art of ignition control that such interruption results in a relatively high voltage being immediately established across the secondary winding, due to the collapsing magnetic fields associated with the interruption of the primary current. The secondary voltage will continue to rise until reaching a break down voltage across electrodes 23, 25 of spark plug 19. Current will thereafter discharge across the gap (i.e., spark current), as is generally understood in the art. In a multi-charge embodiment, block 20 continues recharging and discharging to produce further sparks. After sparking occurs, block 22 conducts ion sensing.

Specifically, block 22 is configured to perform multiple functions. First, block 22 is configured to establish a bias voltage across electrodes 23, 25 for causing an ion current to flow. The structure for performing this function may include any one of a plurality of approaches known in the art. One embodiment employed a zener diode in parallel with a storage capacitor will be described in connection with FIG. 8; however, this is exemplary and not limiting in nature. Block 22 is further configured to provide the means for sensing the ion current and for generating in response thereto an ion current signal. Third, block 22 is configured to determine when to open and close a combustion window (described below) for accurately determining a combustion condition. Fourth, block 22 is configured to convert the ion current signal into a combustion signal indicative of the level or quantity of combustion during the combustion window. In one embodiment, the combustion signal is output on line 36 as a pulse width modulated (PWM) digital signal. Block 22 is still further configured to generate a current flag trip (CF TRIP) signal and, in one embodiment, outputs it also on line 36, multiplexed in time with the combustion signal. Ion buffering block 24 is configured to condition the raw ion current signal, for example, by changing it from a negative polarity to a positive polarity signal.

With continued reference to FIG. 2, ion current-to-knock PWM conversion block 26 is configured to convert the raw ion current signal into a knock signal that is, in one embodiment, pulse width modulated (PWM) on line 38. A knock window signal may be generated by control unit 16, specifically by knock window generation block 32 and is provided to block 26 on line 38. Block 26 determines the knock signal during the knock window. The knock window (i.e., start, end, duration) is defined so as to enable or optimize knock detection. Approaches for the generation of the knock window are known in the art (e.g., determined generally based on the engine position or range of positions in which knock is most likely to occur).

Combustion signal processing block 30 of control unit 16 analyzes the combustion signal provided by ignition coil 10 and may use the information extracted from such analysis to make adjustments in the control of spark, fuel delivery, air and the like in order to improve combustion, according to known strategies. Depending on the degree of misfire (or combustion), adjustments in fewer than all or even only one of the above parameters may be necessary. In addition, regulations exist that require detection of misfire. The art is replete with strategies for combating incomplete combustion and/or misfire.

Knock window generation and knock processing block 32 is configured to generate the knock window signal. It has been observed that knock will most likely occur at the peak of the ion current, which may be from about 10–15° after TDC. Thus, the knock window should be opened at least slightly prior to such time. Block 32 is further configured to process the knock signal provided thereto over line 38. Block 16 can then adjust, if needed, spark timing, fuel delivery, and other controllable combustion parameters. The art is replete with strategies for analyzing knock and minimizing/eliminating its occurrence, and block 16 may employ such conventional strategies.

FIG. 2 further shows that other ignition coils 10 share lines 36 and 38 to form respective common busses. The foregoing is effective in minimizing the number of system connections. This reduction improves reliability and/or reduces cost.

Referring now to FIGS. 3–6, a description of various aspects of the present invention will be made with reference to timing signal diagrams. Circuitry for implementing the inventive features will be described thereafter in connection with FIGS. 7–9. The various aspects of the invention will be addressed in turn.

End of Spark Detection

FIGS. 3A–3J show timing diagrams for various signals in system 10. It is generally desirable to examine the ion current signal over the longest possible time. This is to obtain more comprehensive and thus better information regarding the combustion process. However, there are intervals where the ion current signal is not directly indicative of the level of combustion, for example, during the spark event itself and the subsequent ring out. To consider the magnitude of the ion current signal during these internals may cause errors. Therefore, the level of combustion (or misfire) is determined by analyzing the ion current only during a so-called combustion window. The invention relates to, among other things, when to open and close the combustion window so as to obtain the most information while at the same time ignoring sources of error.

In the first aspect of the present invention, the opening of the combustion window is opened earlier than in conventional systems. As described in the Background, conventional systems open the combustion window (i.e., began processing the ion current signal) only after a fixed delay has elapsed after the initial spark, which delay must be conservatively chosen to be sufficiently long so as to cover the longest case scenario. This prolonged fixed delay, however, results in delaying the opening of the combustion window in many instances where the window could be opened up earlier. Thus, useful information may be effectively ignored. Accordingly to the invention, the overall delay between the initial spark and the opening of the combustion window is variable and is divided into two parts: a variable part and a fixed part (which together is variable). The variable part is defined by determining when the secondary winding current has decayed to about zero milliamps. This interval is variable since the secondary current discharge rate is influenced by many factors, as known in the art. For example, temperature (i.e., affects coil and wiring resistances), engine speed (i.e., affects flow in the cylinder) and the like. The fixed part is configured to cover the period of time that it takes the secondary current to ring out, and is substantially constant under most operating conditions. A fixed delay is therefore selected, and is herein referred to as the end-of-spark ring out delay.

Assume that engine 12 is a four-cylinder engine having cylinders with a firing order of A-B-C-D. FIG. 3A shows an electronic spark timing (EST) B signal associated with cylinder B, which is generated by control unit 16. The EST B signal, on the rising edge, commences the flow of a primary current through ignition coil 10. The primary current is shown in FIG. 3C. When the time for producing a spark occurs, control unit 16 deasserts the EST B signal, shown as a falling edge in FIG. 3A, which operates to interrupt the primary current. This interruption is shown in FIG. 3C. Interruption of the primary current results in a high voltage being established across the secondary, which results in a secondary current in the secondary winding after the gap breakdown (i.e., spark). The secondary current for cylinder B is shown in FIG. 3F. The ignition coil 10 then waits a variable time after the initial spark by determining when the secondary current has discharged to a preselected level. In a non multicharge embodiment, the preselected level is about zero milliamps. In a multicharge mode the preselected level may be non-zero, as it may be desired to avoid allowing the secondary to decay all the way to zero. The end-of-spark ring out delay, however, is substantially fixed.

After the end-of-spark delay, the combustion window for Cylinder B, which is shown in FIG. 3G, is opened. Thereafter, an ionization level is detected using the ion current signal. Significantly, the combustion window is opened as soon as possible, thereby providing the capability of processing the ion current signal for a longer period of time. This early-opening in the combustion window results in obtaining better information. Note that a negative-going spike 50 (FIG. 3H) in the ion current signal for cylinder B, which is not indicative of the level of combustion in cylinder B, is ignored (i.e., the spike is outside of the combustion window). This result is shown in FIG. 3I, which is a buffered (i.e., inverted) and "windowed" (i e., gated with the combustion window) ion current signal. This selectivity minimizes errors in the output combustion signal.

Current Flag Trip (CF TRIP) Signal for Windowing, Dwell Control, Windowing/Output Timing While the end-of-spark processing above pertains to the opening of the combustion window, another aspect of the invention provides improvements in the closing of the combustion window. The invention maintains the window open for the longest period of time possible, closing it only when the spark plug for the next cylinder is ready to be fired. FIG. 3B shows an EST C signal associated with cylinder C of engine 12, the next cylinder in the engine firing order mentioned above. Cylinder B and cylinder C each have a separate ignition coil 10 associated therewith. A current flag trip (CF TRIP) signal is generated, in a preferred embodiment, with respect to each ignition coil 10. The CF TRIP signal for each cylinder, as best shown in FIG. 3D, is generated when the primary current through the ignition coil 10 for that cylinder meets predetermined criteria. Thus, the CF TRIP level transitions high-to-low when the primary current meets the charging current trip level and then transitions low-to-high substantially coincident with the fall of the EST signal. The result is a high-low-high pulse, in the illustrated embodiment.

The combustion window for a cylinder just undergoing combustion (e.g., cylinder B) is closed as a function of the CF TRIP signal associated with another cylinder (e.g., cylinder C), preferably the next cylinder in the engine firing order. In the illustrated embodiment, the combustion window is coordinated to close in timed relationship with the first edge (e.g., falling edge) of the CF TRIP signal for the next cylinder in the firing order, although it could be the second edge (e.g., a rising edge such as shown in FIG. 4C). By delaying the closing of the window to the last possible time (i.e., when the plug for the next cylinder is about to be fired), more information is collected via processing of the ion current signal, improving the assessment of combustion and/or misfire.

The CF TRIP signal may also be used to provide closed loop dwell control. Control unit 16 generates a respective EST signal for each cylinder based on a variety of available information. Such information, however, may become stale. For example, the EST signal is produced only one time every two revolutions of a crankshaft in a four cycle engine. However, engine speed may change during that interval. The CF TRIP signal, on the other hand, is produced four times as often, and may provide information indicative of engine speed. This information (speed information) can be used by ignition coil 10 for multicharge control. In an alternate embodiment, a current flag signal, shown in FIG. 3E, may also be used for closed loop dwell control. The current flag signal is a fixed duration pulse synchronized with the first edge of the CF TRIP signal. It should be understood that the control unit 16 (e.g., an engine control module (ECM) for example) has engine speed information, but ignition apparatus 10 does not. Therefore, ignition coil may be configured to look at the time between current flag pulses. Since for any particular engine configuration (e.g., a V8) the amount of rotation is fixed (e.g., for a V8, 90°), a speed can be calculated. The speed can be used by ignition coil 10 in establishing the length of the multicharge window (i.e., how long to multicharge). Additionally, however, the control unit 16 can look at the CF TRIP signal and fine tune its dwell control. For example, if the control unit 16 is planning to charge apparatus 10 up to 10 amperes ($I_p$), then it expects that apparatus 10 to take a certain amount of time to reach, say, 5 amperes (e.g., the charging trip level). The difference between the actual time and the expected time defines an error signal, which simply reflects variations in coil inductance, system voltage, coil resistance (which varies as a function of temperature), and the like. The control unit is configured to use this error signal to adjust its calculations for generating the EST signal (i.e., duration, start, stop, etc.). Dwell control is improved because it can be based on actual charge time of the coil (e.g., variables such as system voltage, coil inductance, resistance, change in temperature, etc.).

Referring to FIGS. 4A–4J, the CF TRIP signal may also be used for output timing purposes. The EST A, EST B, CF TRIP signal, current flag signal, cylinder B combustion window, and cylinder B ion current signal shown in FIGS. 4A, 4B, 4C, 4D, 4E and 4F are substantially the same as the corresponding signals in FIGS. 3A, 3B, 3D, 3E, 3G and 3H, respectively. FIG. 4G shows an integrated version of the ion current signal, hereafter referred to as a combustion signal indicative of the level of combustion in the cylinder. In this regard, the combustion signal is the time integral of the ion current signal. In one embodiment, the combustion signal, rather than an analog signal, comprises a pulse having a width that is modulated according to the magnitude of the integrated, windowed combustion signal (a "combustion PWM" signal), as shown in FIG. 4H. The double-arrowheaded line in FIGS. 4H, 4I and 4J means that the edge through which the double-arrowheaded line passes can occur earlier than shown or later than shown, depending on its value. As shown in FIG. 4I, the CF TRIP signal provides output timing in that the combustion PWM signal immediately follows after a short time delay 52.

Multiplexing CF TRIP and Combustion PWM Signals

In still another aspect of the invention, the CF TRIP and combustion PWM signals associated with each ignition coil 10 for each cylinder of engine 12 are multiplexed together on the same physical line, namely line 36. This is best shown in FIG. 4I. This is best shown in FIG. 2 for all the ignition coils/cylinders. In still yet another embodiment, shown in FIG. 4J, the combustion PWM signal is multiplexed with the current flag signal. The foregoing reduces the number of connections needed in the system.

Multiplexing Knock Window Signal and Knock PWM Signals

Referring to FIGS. 5A–5J, ignition coil 10 determines a knock signal, indicative of a knock signal condition during a so-called knock window. In one embodiment, the knock window is generated by control unit 16 and is provided to the ignition coils 10 over line 38 (line 38 best shown in FIG. 2). Control unit 16 may determine such a knock window using conventional strategies, for example, based on engine position as described above. Alternatively, if a knock window signal is unavailable in control unit 16 and/or cannot be provided to ignition coil 10, ignition coil 10 may itself generate the knock window, for example, opening the knock window when the combustion signal exceeds a certain value, indicative of a preset level of combustion.

FIG. 5A shows an electronic spark timing (EST) B signal for cylinder B. FIG. 5B shows current flag signals. These signals function as described above. FIG. 5C shows a knock window signal, for example, generated by control unit 16. FIG. 5D shows an ion current signal for cylinder B. FIG. 5E shows a buffered (i.e., inverted) and "windowed" (i.e., gated with the combustion window) ion current signal.

FIG. 5F shows a bandpass filtered ion current signal. As described above, the presence of an AC component of the ion current is indicative of a knock condition. A first knock mode is defined based on the presence of the AC component of the ion current in a frequency range between approximately 5–6 kHz. A second knock mode is defined based on the presence of the AC component of the ion current in a frequency range between approximately 10–12 kHz. Each of these ranges may be looked for in the ion current signal (i.e., the band to be passed may be either or both 5–6 kHz and 10–12 kHz). FIG. 5G shows the signal of FIG. 5F rectified and "windowed" (i.e., gated with the knock window signal). The windowing inhibits transients from generating erroneous outputs or to be mistaken for knock. FIG. 5H shows an integrated version of the knock signal of FIG. 5G. In one embodiment, the knock signal is pulse width modulated (PWM) wherein a pulse is generated having a pulsewidth corresponding to the level of detected knock. This knock PWM signal is shown in FIG. 5I.

In still yet another aspect of the invention, respective knock window and knock PWM signals for each ignition coil 10 for each cylinder of engine 12 are multiplexed together on the same physical line. This is shown in FIG. 5J and FIG. 2. The foregoing reduces the number of connections needed in the system, improving reliability/reducing cost.

Multicharging with Combustion Detect Termination to Ensure Knock Detection Availability One problem with conventional multicharge (i.e., repetitive spark per combustion event) ignition systems is that prolonged sparking may interfere with knock detection. That is, it is difficult and impractical to detect knock (e.g., via an AC component of the ion current signal) when generating actual sparks in the cylinder. In copending application (docket no. DP-300294) entitled "MULTICHARGE IGNITION SYSTEM HAVING COMBUSTION FEEDBACK FOR TERMINATION," assigned to the common assignee of the present invention, a system and method provides for termination of multicharge operation when a predetermined level of combustion is detected, ostensibly to reduce both plug wear and energy waste. In yet another aspect of the present invention, termination of multicharge operation based on a combustion signal is coupled with knock detection. Ignition coils using ion sense are configured with a short spark duration for use at higher speeds. This feature has the advantage of ensuring knock detection availability without restricting the effective spark duration at lower speeds to above-mentioned short spark duration at higher speeds.

FIGS. 6A–6M illustrate this aspect of the invention. FIG. 6A shows an EST B signal, while FIG. 6B shows the current flag signal. Note that the current flag signal indicates that the primary current has reached the charging current trip level. Ignition coil 10 is configured to generate the required multicharge timing and control signals, based on an input EST signal from control unit 16. FIG. 6C shows the secondary current through the secondary winding of ignition coil 10. Note that the initial secondary current is established substantially in sync with the falling edge of the EST B signal (after a brief delay for the gap to break down). FIG. 6D shows a multicharge window signal, which is generated internally by ignition coil 10, and defines the duration of multicharge operation (i.e., the interval over which repetitive spark is applied for a single combustion event in one cylinder). FIG. 6E shows the knock detection window produced by control unit 16. As shown in dashed line format in FIG. 6E, knock processing by ignition coil 10, however, may not begin immediately upon the opening of the knock window when in multicharge operation mode. FIG. 6F shows the combustion window. Note that for multicharge operation, the combustion window need not be continuous, but rather may comprise a series of individual windows configured to capture as much information as possible regarding the level of ionization and thus quality of combustion.

In the multicharge mode, the combustion window is actually a number of different, separate "windows." Initially, with respect to time order, there is a fouled plug window. This window is generated a fixed time (i.e., a turn on ring out delay) after the EST signal asserted. If ion current is sensed during this interval, it must be from either a fouled plug or a preignition condition. This is because no spark has yet been delivered to the combustion chamber. As will be described below, if ion current is sensed during this initial window, the ignition apparatus will send a predetermined signal (e.g., a 50 μsec pulse) to control unit 10. Control unit recognizes the predetermined signal, and can sort out whether the plug is fouled or whether it was preignition, based on its own information. This is best shown in FIGS. 10A–10B.

The next "windows" generated are one or more relatively short combustion windows. Two such windows are shown in FIG. 10C. These windows correspond to recharge intervals during multicharging (i.e., when the primary winding is connected across a power supply to establish a certain level of primary current). Specifically, the windows in this group open a fixed time after the EST signal is asserted, and are closed when the EST signal (i.e., multicharge EST—multicharge EST) is deasserted. In one embodiment, the multicharge EST signal is asserted when the secondary current from the prior spark decays to a secondary current discharge trip level. The multicharge EST signal is deasserted when the primary current reaches a primary current recharge trip level. The opening and closing is shown in FIGS. 10E and 10F (and FIG. 6F). The final combustion "window" during multicharge is relatively long in duration, and is best shown in FIG. 6F. This long window opens a variable time after the last spark. The variable time comprises two parts: (i) a variable time part needed to allow the secondary current to decay to zero; and (ii) a fixed time part is an end-of-spark ring out delay time. The final, long window in multicharge operation may be closed based on the current flag or current trip signal for the next cylinder in the firing sequence.

FIG. 6G shows the ion current signal and FIG. 6H shows an integrated, "windowed" (as defined above) ion current signal. FIG. 6H shows how the level of combustion is "accumulated" during each of the combustion windows. When the level of combustion reaches a level indicative of "robust" combustion, as shown in FIG. 6H, the multicharge window is closed (best shown in FIG. 6D). This may cause charging (i.e., ramping up of the primary current to a predetermined level) to be terminated early. This premature termination is reflected in FIG. 6C, where the level of the corresponding secondary current that is created is reduced. The last spark event during multicharge is unique in that the corresponding secondary current is allowed to discharge to substantially zero, which is also shown in FIG. 6C. Once the end-of-spark ring out delay has elapsed, knock processing can begin. This is shown as the dashed line transition in FIG. 6E. FIGS. 6I, 6J, 6K, and 6L correspond to FIGS. 5F, 5G, 5H and 5I, respectively, described above. FIG. 6M shows the knock window and the knock PWM signal multiplexed on the same line for multiple cylinders, preferably, all the cylinders of engine 12. Since multicharge operation is terminated when "robust" combustion is achieved, the sparking is discontinued. This discontinuation of sparking ensures the availability of knock detection. Robust means a level of combustion above misfire, suitable for sustained operation of the engine.

Figures 7, 8:
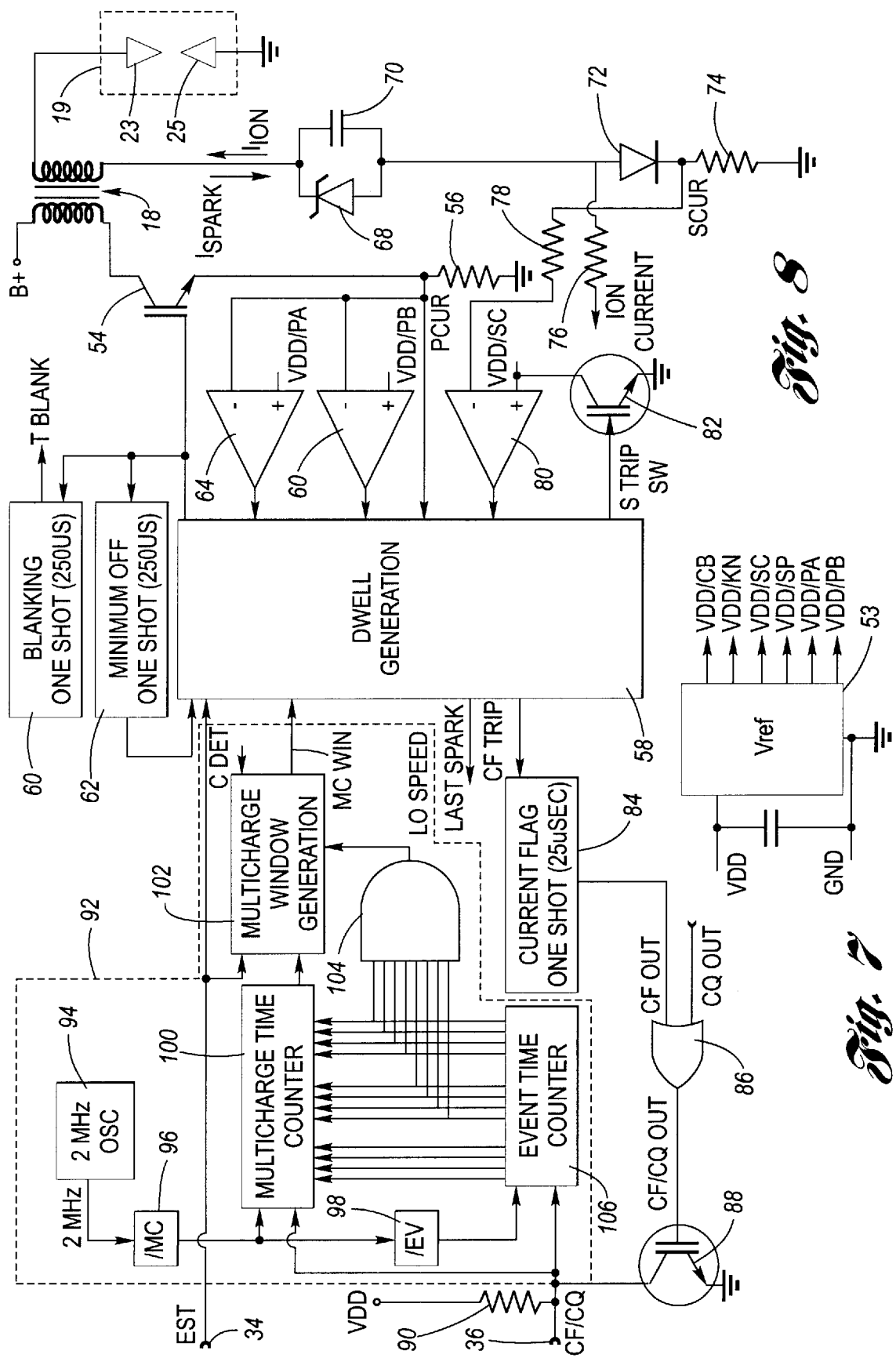
FIGS. 7–9 are simplified schematic and block diagram views showing, in greater detail, portions of the ignition coil shown in block form in FIG. 2.
Figure 9:
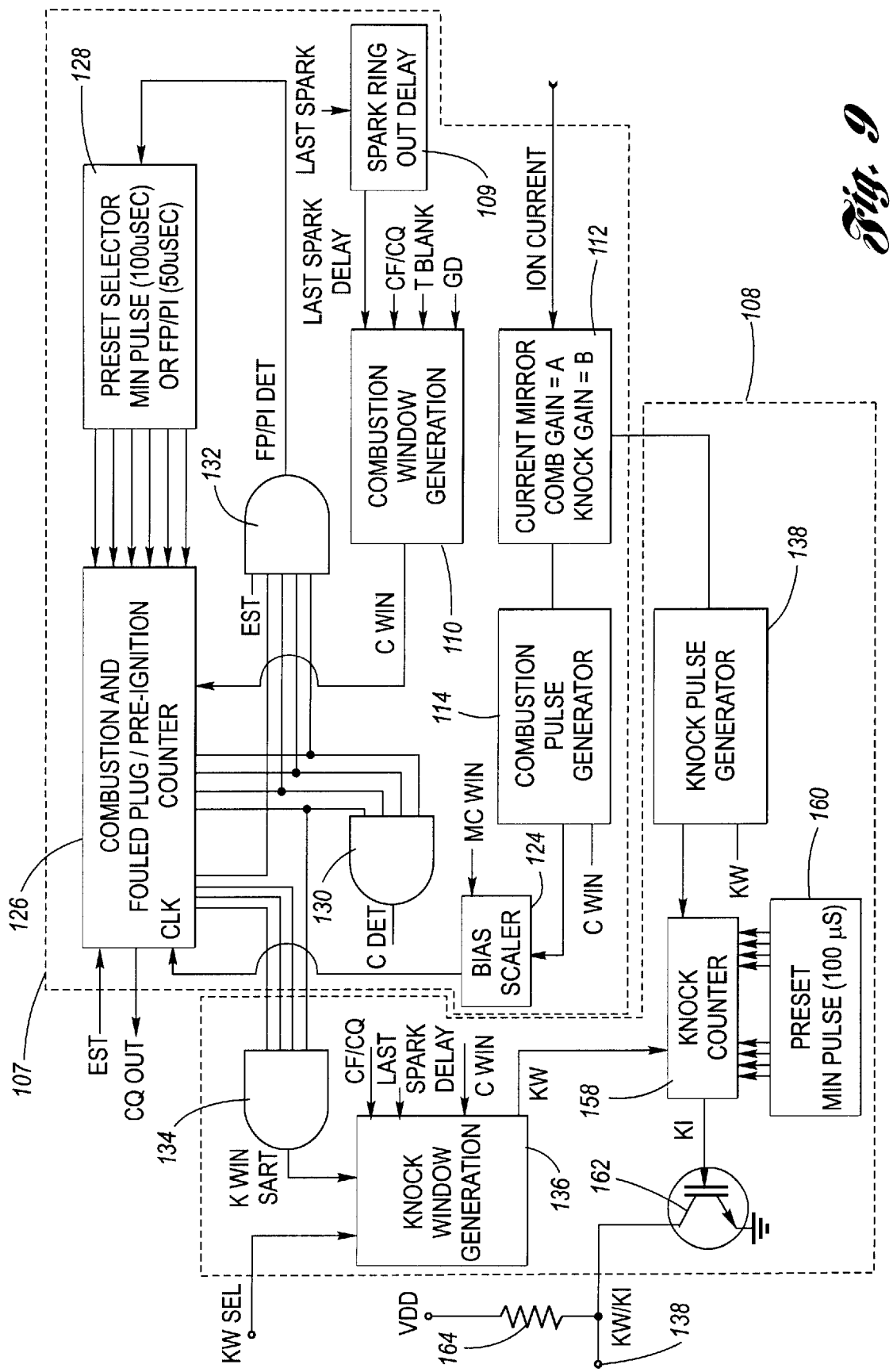

FIGS. 7–9 are simplified schematic and block diagram views of various portions of an exemplary embodiment of ignition coil 10. FIG. 7 is a simplified block diagram of a power conditioning structure 53 configured to produce a plurality of reference voltages for use in the circuit diagrams illustrated in FIGS. 8 and 9. The structure 53 includes an input configured to receive a system voltage, designated VDD, and further includes a plurality of outputs. Many of the output voltages are used as thresholds, for example, for use as an input to a comparator or the like. The output designated VDD/cb represents a voltage that corresponds to a robust combustion threshold. The output designated VDD/sc represents a voltage that corresponds to a secondary current discharge trip level for use in determining when to recharge the coil (i.e., turn the primary current back on). The outputs designated VDD/pa represents a voltage that corresponds to primary current charging trip level used in generating the CF TRIP signal described above. The output designated VDD/pb represents a voltage that corresponds to a primary current recharging trip level (for multicharge).

FIG. 8 is a simplified schematic and block diagram view of exemplary circuitry used in implementing various aspects of the present invention. FIG. 8 shows transformer portion 18 including primary and secondary windings, spark plug 19 including spaced electrodes 23, 25, a power switch 54, a primary current sensing element such as a resistor 56, a dwell generation unit 58, a blanking one shot circuit 60, a minimum off time one shot circuit 62, a first comparator 64, a second comparator 66, a zener diode 68, an ion sense bias capacitor 70, a high voltage diode 72, a secondary current sensing element such as a resistor 74, resistors 76 and 78, a third comparator 80 and a shunt switch 82.

Switch 54 is controlled by a gate drive (GD) signal generated by dwell generation unit 58. Sensing element 56 is illustrated as a resistor; however, it should understood that other conventional elements may be used to develop a signal indicative of the level of primary current. Dwell generation unit 58 develops the GD signal using the EST signal, a multicharge window (MC_WIN) signal, a minimum off time signal from block 62, primary current (PCUR) signal from sensing element 56, and logic signals from comparators 64, 66, and 80. The gate drive (GD) signal thus generated conforms to the description given herein. Dwell generation until 58 may comprise conventional logic components, software, integrated circuitry, or any other realization of the functionality described herein, all known to those of ordinary skill.

The blanking one shot circuit 60 is configured to suppress generation of the combustion window for a predetermined time after the primary current is interrupted—a time where switching noise may be expected to be present in the ion current signal.

The minimum off time one shot circuit 62 is configured to keep the ignition coil 10 from recharging for at least the minimum off time, particularly during multicharge operation. For example, if the spark plug 19 is shorted, the discharge will occur extremely quickly. The minimum off time circuit introduces a minimum delay before the gate drive signal GD can again be reasserted to recharge ignition coil 10.

The output of comparator 64 is configured to change state when the level of VDD/pb primary current exceeds a charging current trip level (VDD/pa).

The output of comparator 66 is configured to change state when the level of primary current exceeds a recharging trip level (VDD/pb—for multicharge). The logical state transitions of comparator 64 is used to generate the current flag trip CF TRIP signal described above or current flag signal. In addition, dwell generation unit 58 may be configured to maintain the actual primary current, as indicated by the primary current signal PCUR, at a maximum predetermined level until the EST signal indicates the time to spark.

Zener diode 68 is configured to have a preselected breakdown threshold voltage. When the primary current is interrupted, the relatively high voltage across the electrodes 23, 25 also causes a reverse breakdown of zener diode 68. Bias capacitor 70 is charged to approximately the same voltage level. This level may be about 80–100 v. Thereafter, during ion sensing, ion current flows through resistor 76, as a result of the bias established by capacitor 70. The ion current continues through the secondary winding and across electrodes 23, 25 of spark plug 19.

After the spark gap breaks down, a secondary current signal (SCUR) is developed by sensing element 74, and is provided via resistor 78 to the inverting input of comparator 80. During non-multicharge operation, the signal designated S_TRIP_SW, which drives the base of transistor 82, is a logic high, which turns on transistor 82, switching the other input (i.e., the non-inverting input) of comparator 80 to ground. Accordingly, the output of comparator 80 switches state when the secondary current discharges to zero, as described above. This causes the Last-Spark signal to be asserted by dwell generation unit 58. When ignition coil 10 is operating in multicharge operation mode, however, dwell generation unit 58 controls transistor 82 to be off, and the output of comparator 80 switches state when the secondary current discharges to a predetermined, positive level defined by the threshold VDD/sc, as described above (e.g., 35 milliamps). This switch in the output of comparator 80 also causes dwell generation unit 58 to be asserted.

FIG. 8 further shows a current flag one shot circuit 84, a logical OR GATE 86, and an output switch such as transistor 88. The components 86 and 88 provide the means for multiplexing a combustion signal (i.e., the combustion quality CQ_OUT signal, to be described below, also referred to herein as the combustion PWM signal) and the current flag signal on the same line, namely line 36. Normally, the line 36 is pulled up to the reference voltage VDD by way of a pull up resistor 90. When either the current flag signal provided by current flag one shot circuit 84 is high, or the combustion signal (CQ_OUT) is high, the transistor 88 will be turned on, thereby pulling line 36 to ground. Although not shown, the CF TRIP signal may alternatively be provided to logical OR GATE 86 instead of the current flag signal in order to multiplex the CF TRIP signal and the combustion signal on the same line 36. It should be further understood that alternative arrangements are possible.

FIG. 8 further shows a multicharge control circuit 92 including an oscillator 94, a multicharge divider 96, an event scaler 98, a multicharge time counter 100, a multicharge window generation circuit 102, a logical AND GATE 104 and a multicharge time calculator 106. It should be noted that a unique feature of multicharge control circuit 92 pertains to a combustion detect (C_DET) signal indicative of robust combustion as an input to the multicharge window generation circuit 102. Multicharge operation may be terminated early (i.e., earlier than it would otherwise terminate) upon receipt of an asserted combustion detect signal. This ensures the availability of knock detection where multicharge operation might otherwise interfere with such knock detection.

Oscillator 94 is configured to provide a stable time base for measuring the time between EST pulses. Multicharge divider 96 is configured to reduce a high frequency oscillator output to a lower frequency so fewer stages are needed in multicharge time counter 100 and multicharge time calculator 106. Multicharge divider 96 may be omitted in an alternate embodiment where oscillator 94 is configured to operate at a lower frequency. Event scaler 98 is configured to establish the portion of the time between EST pulses that multicharging is allowed (i.e., the maximum multicharge window). If set, for example, to 0.20, multicharge could last for 20 percent of the time between EST pulses. Multicharge time counter 100 establishes the end of the multicharge window. It is first loaded with a scaled count from multicharge time calculator 106. Counter 100 then counts down with an unscaled clock. The multicharge window is closed when the count in time counter 100 goes to zero. Multicharge window generator circuit 102 is configured to determine when multicharge operation is allowed. Particularly, multicharge operation starts after the beginning of the EST signal if the engine is operating at a low speed (i.e., below a predetermined speed). Multicharging operation ends when time counter 100 counts down to zero, or, alternatively, if combustion is detected. The AND gate 104 is configured to operate in the nature of a magnitude comparator. Gate 104 detects when a predetermined count output of calculator 106 is reached. The count, which if reached, indicates that the engine speed is below the above-mentioned predetermined speed (i.e., high/low speed threshold) and that multicharging is allowed. Calculator 106 is arranged to establish a maximum time for multicharging by counting the scaled output of multicharge divider 96.

FIG. 9 shows, generally, a combustion processing circuit 107, and a knock processing circuit 108. Combustion processing circuit 107 includes a spark ring out delay 109, a combustion window generation circuit 110, a current mirror circuit 112, a combustion pulse generator 114, a bias scaler 124, a combustion counter 126, a preset selector 128, a first logical AND gate 130 generating the combustion detect (C_DET) signal, and a second logical AND gate 132 for detecting fouled plug on preignition conditions.

The LAST_SPARK signal generated by dwell generation unit 58 corresponds to the change in state of comparator 80 (best shown in FIG. 8). This means that the secondary current has discharged to zero. The last spark signal is provided to spark ring out delay block 109, which delays by a fixed amount such change in state as provided to combustion window generation block 110. Such delay inhibits block 110 from opening the combustion window. Once the fixed delay is over, block 110 may open the combustion window provided the other signals input thereto permit it to do so, in a manner described and illustrated above.

The combustion window generation block 110 is configured to generate the combustion window, designated C_WIN. The other inputs to combustion window generation unit 110 include the current flag/combustion quality signal (CF/CQ), the T_BLANK signal generated by blanking one shot block 60 (best shown in FIG. 8), and the gate drive signal herein designated GD.

During multicharge the various combustion windows described above are opened when the GD signal is high after the T_BLANK one shot has timed out (i.e., the one-shot delay here corresponds to the turn on ring out delay described above). The delay from the one shot prevents noise from the initial turn on from being falsely interpreted as ion current. The combustion window associated with the first GD signal (i.e., which corresponds to the electronic spark timing (EST) signal) is for detection of pre-ignition or fouled plug conditions. During subsequent combustion windows, when the GD signal is high, the spark plug is biased with a "make" voltage. These combustion windows are for detecting combustion during multicharging and thus terminating multicharging when combustion is detected. A final combustion window is also opened after the LAST SPARK DELAY signal is asserted and remains open until the next current flag/combustion quality signal (CF/CQ) signal arrives. This is an additional opportunity to detect combustion at low speed and the only chance for detection at high speed (i.e., at high speeds, multicharge is not used).

The combustion window generation block 110 is configured to generate the combustion window in accordance with the functionality described herein. The combustion window generation block 110 may be implemented using conventional logic gates, software, integrated circuitry or in other ways known to those of ordinary skill in the art.

Current mirror 112 is configured to produce mirror currents based on the level of ion current, and predetermined gains. The combustion signal is reflected in the DC component of the ion current, and current mirror 112 is configured with a first gain factor therefor. The knock condition is reflected in the level of an AC component of the ion current, and current mirror 112 is configured with a second gain factor therefor.

Combustion pulse generator 114 is configured to produce pulses in number corresponding to a DC component of the ion current signal. Combustion pulse generator is enabled when the combustion window signal C_WIN is asserted. Preferably, combustion pulse generator 114 produces pulses in number corresponding to an integrated version of the ion current signal using incremental integration, as more specifically described in copending application entitled "PROCESSING AND INTERFACE METHOD FOR ION SENSE-BASED COMBUSTION MONITOR, " attorney docket no. DP-302882, assigned to the common assignee of the present invention, hereby incorporated by reference.

The pulses from generator 114 act as a clock pulse stream, which are fed to counter 126 by way of bias scaler 124. Bias scaler 124, which is configured to receive the multicharge window signal MC_WIN, operates on the pulses from generator 114 to adjust for the differences in the actual bias voltage applied during multicharge operation as compared to during non-multicharge operation. During multicharge operation, a so-called "make" voltage is applied across electrodes 23, 25 of spark plug 19 to produce the ion current $I_{ION}$, which may be several hundred volts. In contrast, during non-multicharge operation, the ion sense biasing occurs through biasing capacitor 70 which may only have between about 80–100 volts impressed thereacross (i.e., corresponding to the reverse breakdown voltage of zener diode 68). Accordingly, multicharge mode, and non-multicharge mode each have a different bias voltage which will produce a different level of ion current. The difference in ion current will produce pulses from generator 114 at different rates. Since the count in counter 126 is to reflect the level of combustion (based on the pulses), adjustments are preferably made.

Bias scaler 124 may be configured, alternatively, to either divide down the stream of pulses from generator 114 when in multicharge mode (which is preferred), or, alternatively, multiply up the stream of pulses from generator 114 when in the non-multicharge mode. In any event, the stream of pulses are applied to counter 126 at a clock input thereof The stream of pulses operate to increment the counter. The count held in the counter corresponds to the level or quantity of combustion, based on the level of ionization. A preselected count in counter 126 is selected to indicate a robust level of combustion for example, for early termination of multicharge mode as described above. Such outputs are analyzed, for example, by a logic gate such as AND GATE 130 to produce a combustion detect signal (C_DET). In the illustrated embodiment, when the combustion detect signal transitions high, a robust level of combustion has been achieved.

FIG. 9 further shows gate 132 which is configured to select whether a count corresponding to a 100 microsecond pulse width in the combustion PWM output signal (e.g., FIG. 4I), or whether to preselect a count corresponding to a 50 microsecond pulse width. The 100 microsecond pulse width referred to above is that pulse width which would be output on the CQ-OUT line (i.e., the combustion PWM signal) from counter 126, when no combustion at all has been detected in the cylinder of interest.

Gate 132 is configured to produce a fouled plug/pre-ignition detection signal FP/PI_DET signal. The AND gate 132, which could also be a magnitude comparator, detects when a predetermined count is reached while the electronic spark timing (EST) signal is asserted (i.e., high). If such a count is reached, either a fouled plug or a pre-ignition condition exists (the control unit 16 can determine which of the foregoing exists based on engine operating conditions). If the FP/PI_DET signal is asserted, a count corresponding to 50 microseconds is loaded into counter 126 by way of preset selector 128 and normal combustion processing is terminated. The control unit 16 is configured to recognize this 50 µsec pulse as having a special meaning (i.e., either fouled plug or preignition). In a normal situation, a count corresponding to 100 microseconds (i.e., the pulse width time) is preset into counter 126, and such count increases to some maximum count as combustion is detected. If no combustion is detected, therefore, no further increment of counter 126 occurs, and a 100 microsecond pulse will be generated.

Knock processing circuit 108, in the illustrated embodiment, includes a logic gate 134, a knock window generation block 136, a knock pulse generator 138, a knock counter 158, a preset block 160, a switch such as transistor 162, and pull up resistor 164.

Logic gate 134 is configured to generate a signal designated K_WIN_Sart, which functions as a start of knock window indicator. In order for knock to occur, combustion must be well under way. Gate 134 decodes a count corresponding to a preselected level of combustion to be used to indicate when to open or initiate the knock window when, for example, no external knock window is available.

Knock window generation block 136 receives a number of signals on inputs thereof, and produces a knock window signal (KW) signal on an output line. In one embodiment, the knock window is provided by control unit 16, as described above. However, knock window generation block 136 is configured to internally generate the knock window when commanded to do so by way of the knock window select signal (KW_SEL), for example when a knock window signal from a control unit 16 is unavailable.

The knock window is not opened before the end of the LAST_SPARK_DELAY signal, because otherwise coil ring out noise would give a false knock signal. If the knock window is generated internally (i.e., not provided from control unit 16), the knock window starts after the LAST_SPARK_DELAY and K_WIN_START signals are both high, and will endure until the combustion flag/combustion quality signal (CF/CQ) goes high.

Knock pulse generator 138 is configured to produce a stream of pulses in number corresponding to an AC component of the ion current signal. Moreover, knock pulse generator 138 is enabled by the knock window signal KW. Preferably, knock pulse generator 138 produces pulses in number corresponding to an integrated version of the ion current signal using incremental integration, as specifically set forth in copending application entitled "PROCESSING AND INTERFACE METHOD FOR ION SENSE-BASED COMBUSTION MONITOR," attorney docket no. DP-302882, assigned to the common assignee of the present invention. The pulses from generator 114 act as a clock pulse stream, which are fed to counter 158. Counter 158 is incremented upon receipt of a pulse from generator 138. Knock counter 158 may be preset with a count corresponding to a knock PWM signal having a pulse width of 100 microseconds, for example (i.e., this preset duration when output means no knock). Upon command, the knock counter 158 produces an output signal (KI) that causes the line 38 to be pulled down to ground for a duration (pulse width) corresponding to the count contained in the knock counter.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

What is claimed is:

1. A method of operating a plurality of ignition coils in a multi-cylinder internal combustion engine comprising the steps of:

(A) initiating combustion in a first cylinder using a first one of the ignition coils;
   (B) detecting an ionization level in the first cylinder during a combustion window;
   (C) generating current flag signal when a primary current through a second one of the ignition coils meets predetermined criteria; and
   (D) closing the combustion window when the current flag signal is generated.

2. The method of claim 1 wherein the engine has a cylinder firing sequence associated therewith, the second ignition coil being associated with a second cylinder that is next in the firing sequence after the first cylinder.

3. The method of claim 1 wherein the predetermined criteria comprises a charging current trip level.

4. The method of claim 3 wherein said generating step comprises the substeps of:

generating the current flag signal in a first state;
   transitioning the current flag signal from the first state to a second state along a first edge when the primary current of the second ignition coil charges to the charging current trip level; and
   returning the current flag signal from the second state to the first state along a second edge.

5. The method of claim 4 wherein the charging current trip level and the discharging current trip level are different.

6. The method of claim 4 wherein the charging and discharging current trip levels are the same.

7. The method of claim 4 wherein said step of closing the combustion window occurs in timed relationship with one of the first and second edges.

8. The method of claim 4 further comprising the step of generating a combustion signal when the combustion window is closed using said detected ionization level.

9. The method of claim 8 wherein said step of generating the combustion signal includes the substep of integrating said ionization level over the combustion window.

10. The method of claim 9 wherein said step of generating the combustion signal includes the substep of pulse width modulating the counter output.

11. The method of claim 10 further comprising the step of electrically connecting a respective output from each one of the ignition coils for carrying the current flag and combustion signals.

12. The method of claim 11 further including the step of:

generating repetitive spark during a single combustion event in the first cylinder in accordance with timing characteristics of the current flag signal from the plurality of ignition coils.

13. A method of operating an ignition coil for an internal combustion engine comprising the steps of:

(A) generating a spark in a cylinder using the ignition coil wherein a secondary current is established therethrough;
    (B) determining a time the secondary current has discharged to a preselected level and commencing recharge of the ignition coil;
    (C) initiating a delay after said determined time and opening a combustion window; and
    (D) detecting a level of ionization during the combustion window.

14. The method of claim 13 further including the step of:

defining the preselected level as a function of engine speed.

15. The method of claim 13 further including the step of:

defining the preselected level as a function of whether the cylinder is being subjected to a plurality of sparks per combustion event.

16. The method of claim 13 wherein the preselected level is zero.

17. The method of claim 16 wherein the delay is a fixed time.

18. The method of claim 13 further comprising the step of generating a combustion signal after the combustion window has closed.

19. A method of operating a plurality of ignition coils in a multi-cylinder internal combustion engine comprising the steps of:

(A) providing a knock detection window on a communication line between a controller and the ignition coils;
    (B) detecting a knock intensity level during the knock detection window;
    (C) outputting a knock signal based on the detected knock intensity level on the communication to thereby multiplex the knock detection window and the knock intensity level.

20. The method of claim 19 wherein said providing a knock detection window step includes the substep of:

generating the knock detection window at the controller.

21. The method of claim 19 wherein said providing a knock detection window step includes the substep of:

generating the knock detection window at a respective one of the ignition coils.

22. The method of claim 19 wherein said step of generating the knock signal includes the substep of:

generating a knock pulse having a pulsewidth corresponding to the knock signal.

23. The method of claim 19 further comprising the steps of:

repetitively sparking a first cylinder in the engine during a single combustion event using a first one of the ignition coils;
    discontinuing said repetitive sparking step when a predetermined level of combustion is obtained in the first cylinder; and
    beginning said step of detecting the knock intensity a predetermined time after repetitive spark has been discontinued.

24. The method of claim 23 further comprising the step of:

selecting the predetermined time so as to correspond to a ring out delay associated with a spark event.

* * * * *